United States Patent
Zhang et al.

(10) Patent No.: US 7,096,955 B2
(45) Date of Patent: Aug. 29, 2006

(54) LONG DURATION FUEL CELL SYSTEM

(75) Inventors: Wenlin Zhang, Missouri City, TX (US); Joe Walter, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 373 days.

(21) Appl. No.: 10/326,371

(22) Filed: Dec. 18, 2002

(65) Prior Publication Data
US 2003/0116321 A1    Jun. 26, 2003

Related U.S. Application Data

(63) Continuation-in-part of application No. 09/858,228, filed on May 15, 2001, now Pat. No. 6,575,248.

(60) Provisional application No. 60/204,676, filed on May 17, 2000, provisional application No. 60/285,769, filed on Apr. 23, 2001, provisional application No. 60/353,567, filed on Feb. 1, 2002.

(51) Int. Cl.
*E21B 29/12* (2006.01)
*E21B 29/02* (2006.01)
*E21B 36/00* (2006.01)

(52) U.S. Cl. .............. 166/338; 166/368; 166/55.1; 166/302

(58) Field of Classification Search ............. 166/368, 166/338, 302, 65.1, 243
See application file for complete search history.

(56) References Cited

U.S. PATENT DOCUMENTS

| | | | |
|---|---|---|---|
| 2,643,087 A * | 6/1953 | Ogorzaly et al. ............. | 175/93 |
| 3,278,335 A | 10/1966 | Hitzman ................... | 136/85 |
| 3,280,923 A | 10/1966 | Muench ..................... | 175/26 |
| 3,342,267 A * | 9/1967 | Cotter et al. .................. | 166/60 |
| 3,664,442 A | 5/1972 | Rosser et al. ............... | 175/231 |
| 3,664,873 A | 5/1972 | Buswell et al. ............ | 136/86 C |
| 3,665,955 A * | 5/1972 | Conner, Sr. ................. | 137/495 |
| 4,110,628 A | 8/1978 | Paull et al. ................. | 290/1 R |
| 4,250,230 A | 2/1981 | Terry ........................... | 429/12 |
| 4,629,537 A * | 12/1986 | Hsu ............................. | 429/32 |
| 4,738,904 A * | 4/1988 | Ludwig et al. .............. | 429/17 |
| 4,808,037 A * | 2/1989 | Wade et al. ................ | 405/226 |
| 4,826,742 A * | 5/1989 | Reiser ......................... | 429/33 |
| 4,910,100 A | 3/1990 | Nakanishi et al. ........... | 429/32 |
| 5,133,406 A | 7/1992 | Puri ........................... | 166/266 |
| 5,202,194 A | 4/1993 | VanBerg, Jr. ................ | 429/13 |
| 5,265,677 A * | 11/1993 | Schultz ...................... | 166/302 |
| 5,316,869 A | 5/1994 | Perry, Jr. et al. ............. | 429/19 |
| 5,344,721 A * | 9/1994 | Sonai et al. .................. | 429/20 |
| 5,429,885 A | 7/1995 | Stockburger et al. ......... | 429/13 |
| 5,470,671 A | 11/1995 | Fletcher et al. .............. | 429/26 |
| 5,922,485 A | 7/1999 | Enami ......................... | 429/26 |

(Continued)

FOREIGN PATENT DOCUMENTS

EP    1018744 A1    7/2000

(Continued)

OTHER PUBLICATIONS

"Fuel Cell Descriptions," http://www.dodfuelcell.com (Mar. 31, 2000).

(Continued)

*Primary Examiner*—Thomas A Beach
(74) *Attorney, Agent, or Firm*—Williams, Morgan & Amerson, P.C.

(57) ABSTRACT

A subsea fuel cell and system adapted for long duration use. The subsea fuel cell comprises a fuel cell stack and a water discharge system. In alternate embodiments, the subsea fuel cell can further comprise an impurity discharge system.

26 Claims, 14 Drawing Sheets

U.S. PATENT DOCUMENTS

| | | | | |
|---|---|---|---|---|
| 5,935,725 A | * | 8/1999 | Dhar et al. | 429/12 |
| 6,015,633 A | | 1/2000 | Carlstrom, Jr. et al. | 429/13 |
| 6,045,935 A | | 4/2000 | Ketcham et al. | 429/30 |
| 6,063,515 A | | 5/2000 | Epp et al. | 429/17 |
| 6,082,452 A | * | 7/2000 | Shaw et al. | 166/105.5 |
| 6,138,758 A | * | 10/2000 | Shaw et al. | 168/265 |
| 6,150,601 A | * | 11/2000 | Schnatzmeyer et al. | 136/201 |
| 6,150,610 A | | 11/2000 | Schnatzmeyer et al. | 136/201 |
| 6,253,847 B1 | | 7/2001 | Stephenson | 166/248 |
| 6,279,658 B1 | * | 8/2001 | Donovan et al. | 166/313 |
| 6,397,946 B1 | * | 6/2002 | Vail, III | 166/250.01 |
| 6,454,011 B1 | | 9/2002 | Schempf et al. | 166/381 |
| 6,575,248 B1 | * | 6/2003 | Zhang et al. | 166/338 |
| 6,675,888 B1 | * | 1/2004 | Schempf et al. | 166/65.1 |
| 6,684,948 B1 | * | 2/2004 | Savage | 166/248 |
| 6,686,079 B1 | * | 2/2004 | Zhang et al. | 429/25 |
| 2002/0011335 A1 | | 1/2002 | Zhang et al. | 166/335 |

FOREIGN PATENT DOCUMENTS

| | | |
|---|---|---|
| EP | 1018774 A1 | 7/2000 |
| GB | 1144322 | 3/1969 |
| GB | 1144322 A | 3/1969 |
| GB | 1190601 | 5/1970 |
| GB | 1190601 A | 5/1970 |
| JP | 6 124 719 | 5/1994 |
| SU | 1344170 A1 | 11/1993 |
| WO | WO98/40603 | 9/1998 |
| WO | WO99/27599 | 6/1999 |
| WO | WO 1999/027599 A1 | 6/1999 |
| WO | WO01/97310 | 12/2001 |
| WO | WO 2001/097310 A1 | 12/2001 |

OTHER PUBLICATIONS

"Fuel Cell Glossary," from U.S. Fuel Cell Council (Aug. 19, 1999).

* cited by examiner

LONG DURATION FUEL CELL SYSTEM

This application claims the benefit of U.S. provisional Application No. 60/353,567, filed Feb. 1, 2002, and is a continuation-in-part of U.S. application Ser. No. 09/858,228, filed May 15, 2001, now U.S. Pat. No. 6,575,248, claiming the benefit of U.S. Provisional Application No. 60/204,676, filed May 17, 2000, and U.S. provisional Application No. 60/285,769, filed Apr. 23, 2001.

TECHNICAL FIELD OF THE INVENTION

This invention relates to fuel cells, and in one embodiment, to fuel cells that are especially well suited for long duration downhole use in oil and gas wells, and for subsea use in connection with offshore wells. The invention can also be useful for commercial energy generation, powering electric vehicles, and powering other equipment, for example, communication and control equipment located in remote areas away from commercially available power sources.

BACKGROUND OF THE INVENTION

Several types of equipment used downhole in oil and gas wells, or beneath the surface of the sea adjacent to offshore wells, are electrically operated or actuated. Examples of such equipment include certain wireline tools and remote well telemetry equipment. The electrical power required can be provided by connecting the device to a surface power source via electrical cables, or by placing a power source near the site of the device itself. Often it is not practical to use electrical cables running from the surface to the subterranean or subsea site of the electrically-powered device, because of the great distance involved, or because the cables can interfere with the passage of other equipment through the wellbore, and are vulnerable to being damaged during well operations.

Batteries can be used as a local source of power for downhole and subsea electrical devices, but are subject to their own problems. For example, increasing the power and energy generation capacity of a battery generally requires a proportionate increase in the size of the battery, which can present difficulties given the space constraints that exist in wellbores. Also, batteries will typically need to be electrically recharged at some point, thereby often making it necessary to provide some type of recharging equipment in physical proximity to the battery.

Fuel cells make use of an electrochemical reaction involving a fuel and an oxidant in a cell that comprises an anode, cathode, and electrolyte, to generate electricity without also generating the unwanted by-products associated with combustion, while providing relatively higher energy efficiency. Thus, fuel cells potentially have a number of advantages over other power generation or storage means in many applications. The fuel cells of the present invention can be used in a variety of applications. Although the invention is primarily described herein in relation to applications involving subterranean wellbores, it should be understood that the invention can be used in applications other than wellbore applications.

DETAILED DESCRIPTION OF PREFERRED EMBODIMENTS

Embodiments of the present invention provide a practical means of using fuel cells in downhole or subsea locations to power electrical devices that are used far below the surface of the well or the surface of the water. However, it should be understood that the fuel cells of the present invention can be used in other contexts as well, and the invention is not limited to subsea and downhole uses in or around oil or gas wells. In some applications, a fuel cell can supply more reliable and a greater cumulative quantity of power than alternative forms of energy, such as batteries. The greater energy and power density of a fuel cell over other alternatives can often decrease the weight and size of the overall power unit. The decrease in size of the fuel cell power unit can enable the use of instruments and tools requiring electrical power in applications where they could not be utilized before. Fuel cells are considered an environmentally clean energy source since the primary waste product generated from fuel cell usage is water (assuming a fuel source of hydrogen).

Figure 1:
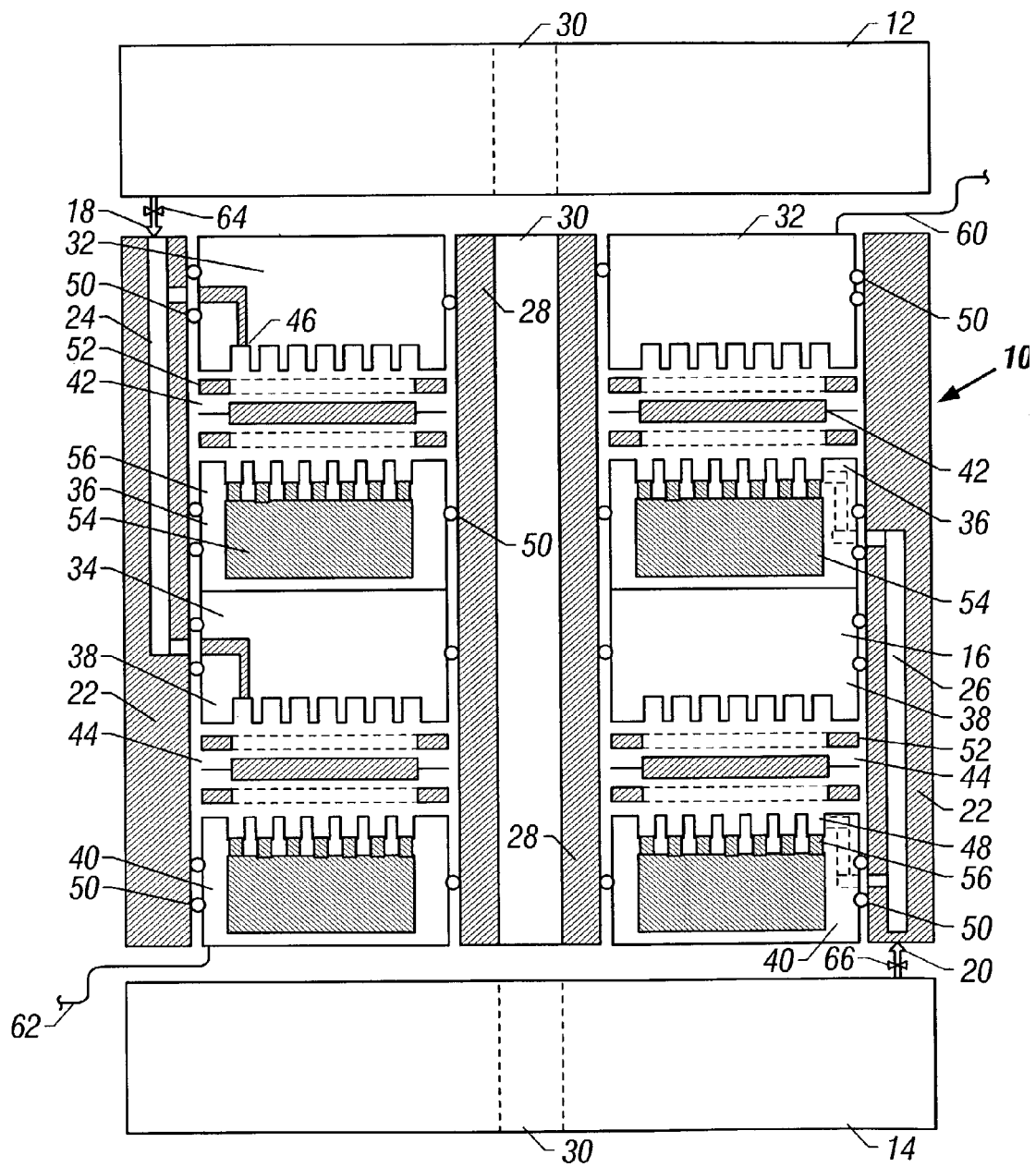
FIG. 1 is a cross-sectional drawing of a fuel cell comprising two fuel cells in a stack configuration.

FIG. 1 shows an embodiment of the fuel cell described in U.S. application Ser. No. 09/858,228, now U.S. Pat. No. 6,575,248, and incorporated herein by reference. The fuel cell 10 comprises a fuel vessel 12, an oxidant vessel 14, and a reaction zone 16. The fuel vessel 12 comprises a source of a fuel suitable for use in the fuel cell, such as hydrogen gas or a reformed hydrocarbon. In one embodiment, the fuel vessel comprises a metal hydride. This provides a high-density means for storing hydrogen. Hydrogen gas is released from the solid hydride, and flows through a fuel conduit 18 to the reaction zone 16. Alternatively, the vessel could comprise hydrogen gas under high pressure (e.g., 500 to 5000 psig). Utilizing a metal hydride for hydrogen storage has a number of advantages over a conventional high-pressure gas storage system. The metal hydride can provide more storage capability on a per unit volume basis and the lower pressure metal hydride can provide a safer mode of operation, especially in a high temperature environment. Another alternative fuel providing more storage capability on a per unit volume basis is a chemical such as powerball that reacts with the sea water to generate power. Thus, the size of the fuel reservoir is greatly reduced. The fuel supply to the reaction zone 16 is controlled by a valve 64 that is typically a pressure control valve.

Similarly, the oxidant vessel 14 contains an oxidant, such as air or oxygen gas under high pressure (e.g., 5,000 to 15,000 psig), that flows through an oxidant conduit 20 to the reaction zone. The oxidant supply to the reaction zone 16 is controlled by a valve 66 that is typically a pressure control valve. The valves 64, 66 control the pressure within the reaction zone 16. Since there are fuel and oxidant inlets but no gas outlets from the reaction zone 16, embodiments such as this can be referred to as a closed end reaction zone or a fuel cell having a closed end chamber on the fuel side and the oxidant side. The term closed end chamber is meant to refer to a chamber having a gas inlet, no gas outlet, and optionally having a water outlet.

The fuel cell in this embodiment comprises an outer wall 22 that has a circular cross-section in a horizontal plane. Within this wall are passageways 24 and 26 for fuel and oxidant, respectively. These passageways act as extensions of the fuel conduit 18 and the oxidant conduit 20, and serve to carry fuel and oxidant to the desired sites in or adjacent to the electrodes of the fuel cell.

Figure 2:
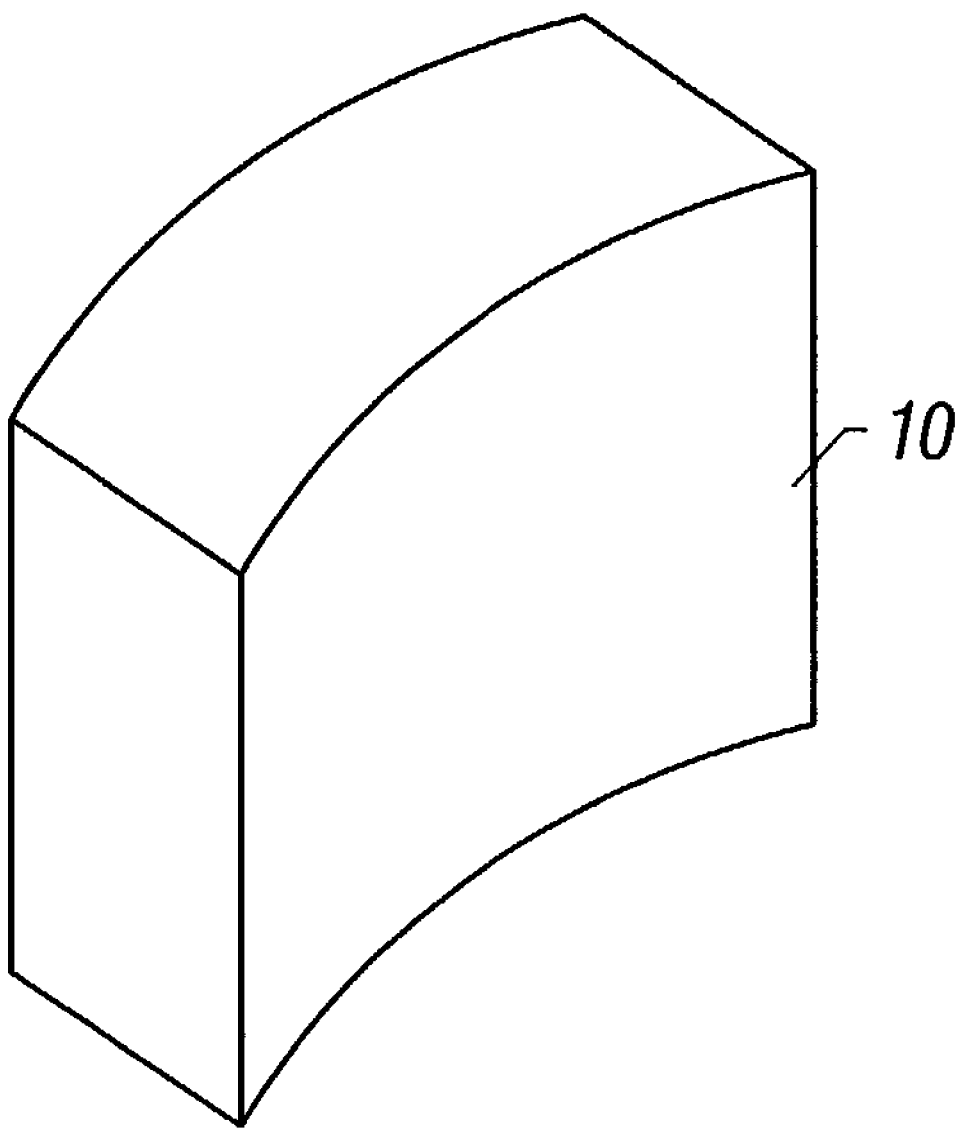
FIG. 2 is an alternative fuel cell shape.

The fuel cell also comprises an inner wall 28, that also has a circular cross-section in a horizontal plane. This inner wall 28 defines an open longitudinal bore 30 through the center of the reaction zone. The fuel vessel 12 and oxidant vessel 14 may also comprise such an open longitudinal bore 30 along their longitudinal axis. Note, however, that the fuel cell may be circular or have any other shape desired. FIG. 2 shows an alternative housing shape that is a portion of an annulus, or arcuate. The housing may have some other shape that facilitates placement of the fuel cell in an annulus.

The cylindrical housing and open longitudinal bore are especially useful when the fuel cell apparatus is to be used downhole in an oil or gas well, or in a subsea location adjacent to an offshore well. The cylindrical shape allows the apparatus to conform to the space available inside well casing or tubing, or inside a riser pipe of an offshore platform. The open longitudinal bore allows space for cable or downhole tools to pass up or down therethrough, without interfering with the operation of the fuel cell. An annular design of the fuel cell can also allow produced fluids to flow through the longitudinal bore. This fluid flow can be useful in assisting in the removal of heat generated within the fuel cell. The fuel cell may include other passageways therethrough, such as control line passageways that facilitate the routing of lines through the fuel cell to equipment mounted below the fuel cell.

Referring back to FIG. 1, within the annular space defined by the outer wall 22 and the inner wall 28 lies the reaction zone 16 of the fuel cell. This reaction zone comprises an anode plate 32, a bipolar plate 34 that comprises a cathode plate portion 36 on one of its sides and an anode plate portion 38 on its other side, and a cathode plate 40. Between each anode and cathode lies electrolyte. The fuel cell employs proton exchange membranes 42 and 44 as electrolyte. These components may be stacked in various combinations to provide fuel cells with more or fewer reaction zones and membranes.

The fuel conduit 18 can pass through the outer wall 22 and into each anode plate 32 and 38, where it can empty into grooves 46 in the anodes. This allows feeding of fuel to the surface of the anode plates. Similarly, the oxidant conduit 20 can pass through the outer wall 22 and into each cathode plate 36 and 40, where it can empty into grooves 48 in the cathodes.

The reaction zone of the fuel cell may also comprise a plurality of seal members 50, such as O-rings, to seal the electrodes against the outer wall 22 and inner wall 28. In an alternate embodiment the reaction zone may comprise seals, such as fluorocarbon polymer (e.g., Teflon) seal members 52 (e.g., gaskets) between the electrodes and the proton exchange membrane.

In this embodiment, the fuel cell comprises a receptacle for water, optionally located within the fuel cell, so that water need not be pumped or otherwise expelled from the fuel cell housing. In particular, water vessels 54 are located within the cathode plates 36 and 40, and are connected to the surface of each cathode by capillary tubes 56. These tubes 56 allow water formed by the fuel cell reaction to be drawn into the vessels 54, thereby eliminating the need to pump the water to an external disposal site. The water formed by the fuel cell reaction can be drawn into the vessels by capillary action, gravity, or a combination of the two. The capillary effect removes water from the reaction zone without regard to the orientation of the fuel cell stack. This fact can be particularly useful for applications within wellbores that are deviated from vertical, such as in horizontal laterals.

The totally enclosed design results in highly efficient fuel and oxidant usage, since the reactants, typically H2 and O2, remain within the fuel cell stack until they are consumed in the reaction and only the reaction product (H2O) is removed from the reaction zone.

In alternative embodiments wherein the location or application of the fuel cell dictates size constraints on the water reservoir, a pump can be provided therein to remove water. For example, in seabed production well systems where the fuel cell must have a long duration life (i.e., one year) coupled with high power capability, the produced water cannot be carried within the fuel cells and must be pumped to the surrounding seawater.

Figure 3:
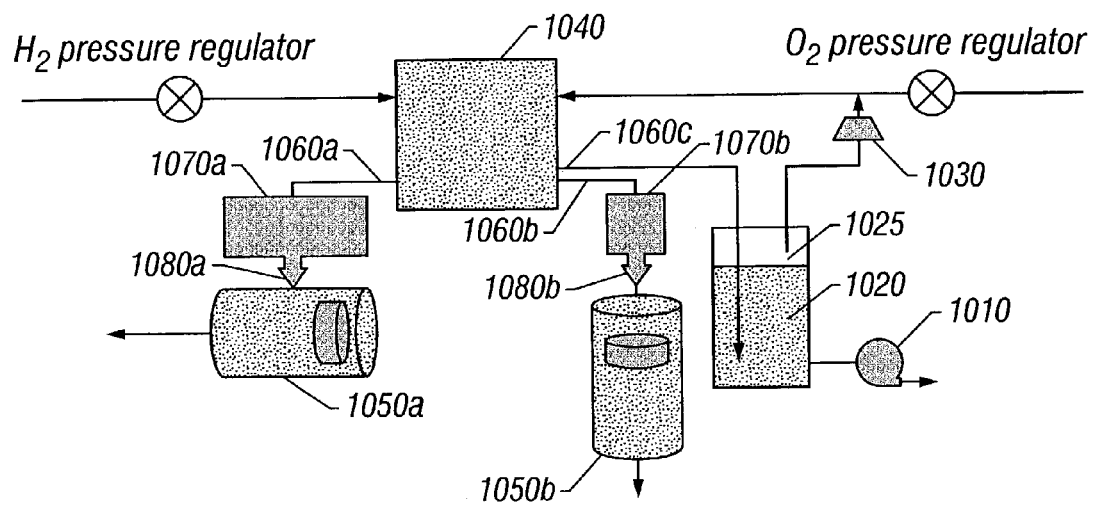
FIG. 3 illustrates an embodiment of the long duration fuel cell system of the present invention.

An embodiment of a long duration fuel cell system for use in a seabed production system is shown in FIG. 3. As shown, a water discharge pump 1010 disposes the water product from the water reservoir 1020 into the surrounding seawater. Depending upon the depth of the fuel cell stack 1040, the water discharge pump 1010 may require substantial electric power to overcome the seawater's associated pressure.

However, the increased power requirement is offset by the lack of need for the water discharge pump 1010 to be active continuously.

Figure 4:
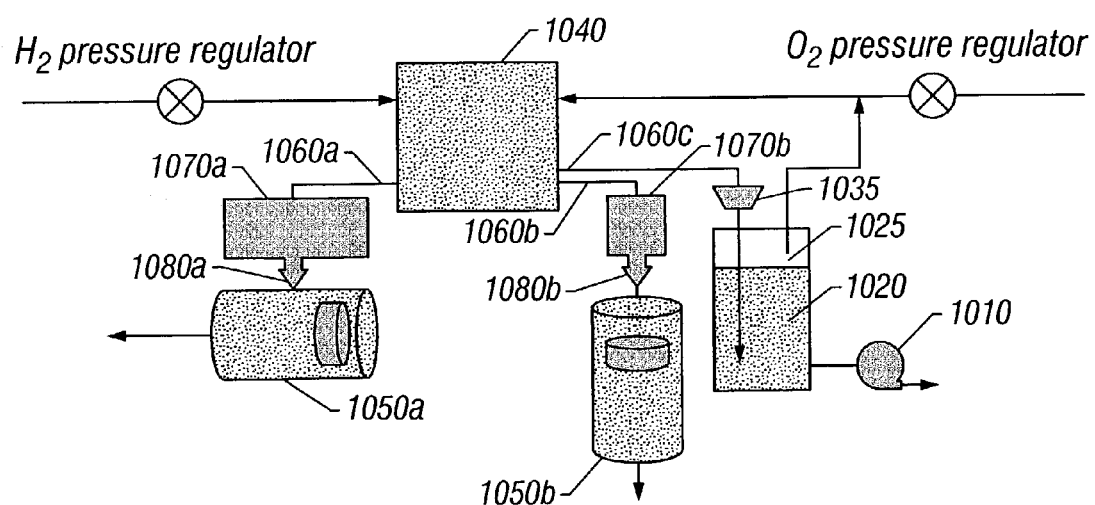
FIG. 4 illustrates another embodiment of the long duration fuel cell system of the present invention.

A smaller gas circulation pump 1030 is used for $O_2$ flow and dynamic water removal from the fuel cell stack 1040 into the water reservoir 1020. The gas circulation pump 1030 is used to circulate the gas in the oxygen loop. The circulation results in the water steam produced on the cathode side of the fuel cell stack 1040 being carried into the gas/liquid separator 1025. Oxygen rich gas is fed from the top of the separator 1025 back into the fuel cell stack 1040. The gas circulation pump 1030 can be continuously or intermittently active, but runs at a substantially lower power than the water discharge pump 1010. In an alternate embodiment of the long duration fuel cell system, the gas circulation pump 1030 is replaced by a water pump 1035 as shown in FIG. 4.

Hydrogen and oxygen consumption is relatively small for the downhole and subsea fuel cells utilized by the long duration fuel cell system. As a consequence, very high purity gas supplies can keep the fuel cell system running for the required life. However, for the long duration fuel cell system, it may not be financially practical to use mega-liters of high grade hydrogen and oxygen gases. If such is the case, the embodiments shown in FIGS. 3 and 4 act to combat the impurities or inert gases introduced into the fuel cell stack 1040 by the low grade fuels and oxidizers.

The fuel cell stack 1040 is a self-enclosed system with all of the venting valves closed at normal conditions to prevent the surrounding seawater from flooding into the system. There are three venting ports in the system—the hydrogen vent port 1060a for venting to the hydrogen discharge chamber 1070a, the oxygen vent port 1060b for venting to the oxygen discharge chamber 1070b, and the water vent port 1060c for venting the water byproduct to the water reservoir 1020. The fuel cell stack 1040 operates at a higher pressure than the hydrogen and oxygen discharge chambers 1070a, 1070b. Solenoid valves 1080a, 1080b periodically open to flush the impurities and extra moisture into the chambers 1070a, 1070b. After the chambers 1070a, 1070b reach a certain pressure (the fuel cell stack 1040 operating pressure), two piston discharge pumps, or vacuum pumps, 1050a, 1050b are turned on to discharge the impurities into seawater.

In the above described embodiment of a long duration fuel cell system, all pumps are powered by the fuel cell stack 1040.

Although the long duration fuel cell system of the present invention can make use of different types of fuel cells, such as phosphoric acid fuel cells and alkaline fuel cells, it is also possible to use proton exchange membrane fuel cells. The anodes and cathodes in such proton exchange membrane fuel cells can be made by applying a small amount of platinum black to one surface of a thin sheet of porous, graphitized paper. The membrane is often sandwiched between the anode and cathode and the three components sealed together under heat and pressure to produce a single "membrane/electrode assembly." The proton exchange membrane may be made from a polymer such as NAFION (available from Dupont). The anode and cathode are typically contacted on the back side by flow field plates made of graphite in which channels have been formed. The channels supply fuel to the anode and oxidant to the cathode. Hydrogen from the fuel gas stream is consumed at the anode, yielding electrons to the anode and producing hydrogen ions, that enter the membrane. At the cathode, oxygen combines with electrons from the cathode and hydrogen ions from the membrane to produce water.

Yet another type of fuel cell that can be utilized with the present invention is a solid oxide fuel cell. The solid oxide fuel cell uses a ceramic, solid phase electrolyte that reduces corrosion considerations and eliminates the electrolyte management problems associated with the liquid electrolyte fuel cells. A ceramic material that can be used for this application is dense yttria-stabilized zirconia, that is an excellent conductor of negatively charged oxygen (oxide) ions at high temperatures. In order to achieve adequate ionic conductivity in such a ceramic, the system must operate at elevated temperatures, such as about 650 degrees C. or higher. The anode can be, for example, a porous nickel/zirconia cermet while the cathode can be, for example, a magnesium-doped lanthanum manganate. Numerous individual cells can be connected together by high temperature semiconductor contacts to increase the power output. The solid oxide fuel cell is not restricted by operating pressure within the fuel cell and can operate in, for example, operating pressure ranges from atmospheric to in excess of 400 psi. The ability to operate with a high operating pressure can be beneficial in designing the fuel cell for high temperature/high pressure applications.

Certain embodiments of the long duration fuel cell system, for example, can be used to power an electric vehicle having a hydrocarbon fuel source. Operating at elevated temperature and pressure as mentioned above, the fuel cell would have a reduced tendency for CO fouling. Being a closed end system, (having fuel and oxidant inlet, but only water outlet from the reaction zone), the CO that is present in the fuel will collect within the reaction zone. The CO that builds up within the reaction zone can be vented at periodic intervals in a controlled manner so as to maintain the desired pressure within the reaction zone. The produced water can be collected within a water containment vessel and pumped in a controlled manner to so as not to have water storage capacity become a restriction upon the longevity of the fuel cell life.

Figure 5:
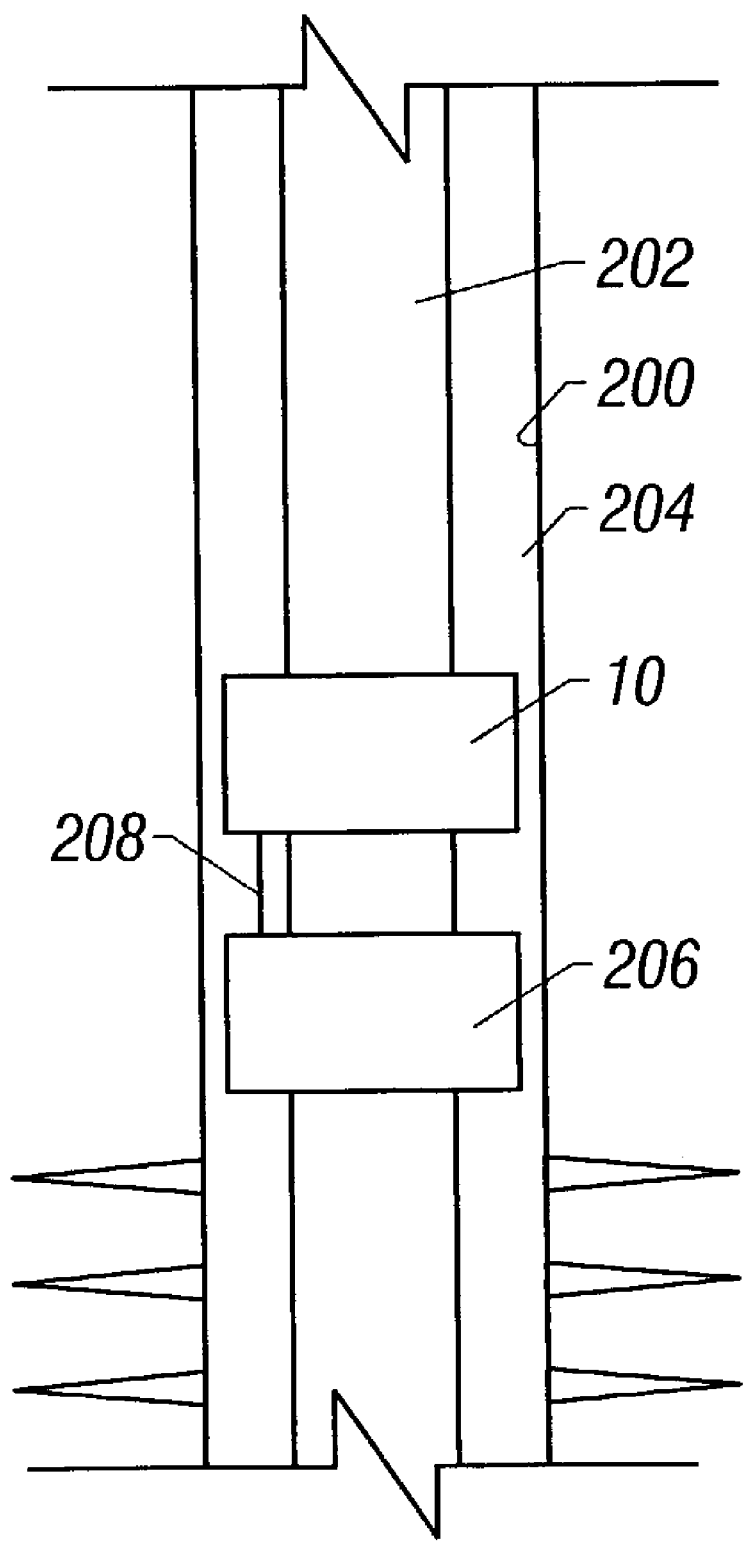
FIG. 5 is a schematic drawing of an embodiment of the long duration fuel cell system having a fuel cell with a water discharge system located in a wellbore.

FIG. 5 provides a schematic diagram of an embodiment of the long duration fuel cell system showing a fuel cell 10 having a water discharge system located in a well 200. A tubing string 202 extends into the well 200. The fuel cell is positioned in the well, would typically be attached to a tubing string and primarily residing in the annular space 204 between the production tubing and the well (which may include casing, a liner, or be open hole). Note that the fuel cell may also be used in wells that do not contain a tubing string. The fuel cell is in electrical communication with downhole equipment 206 such as by a communication line 208. As discussed, the downhole equipment may comprise any equipment positioned downhole that is capable of utilizing or that requires electricity. The heat generated by the fuel cell may also be used in some downhole environments (as in highly viscous, cool environments) and the downhole equipment includes devices that may use the generated heat.

Figure 6:
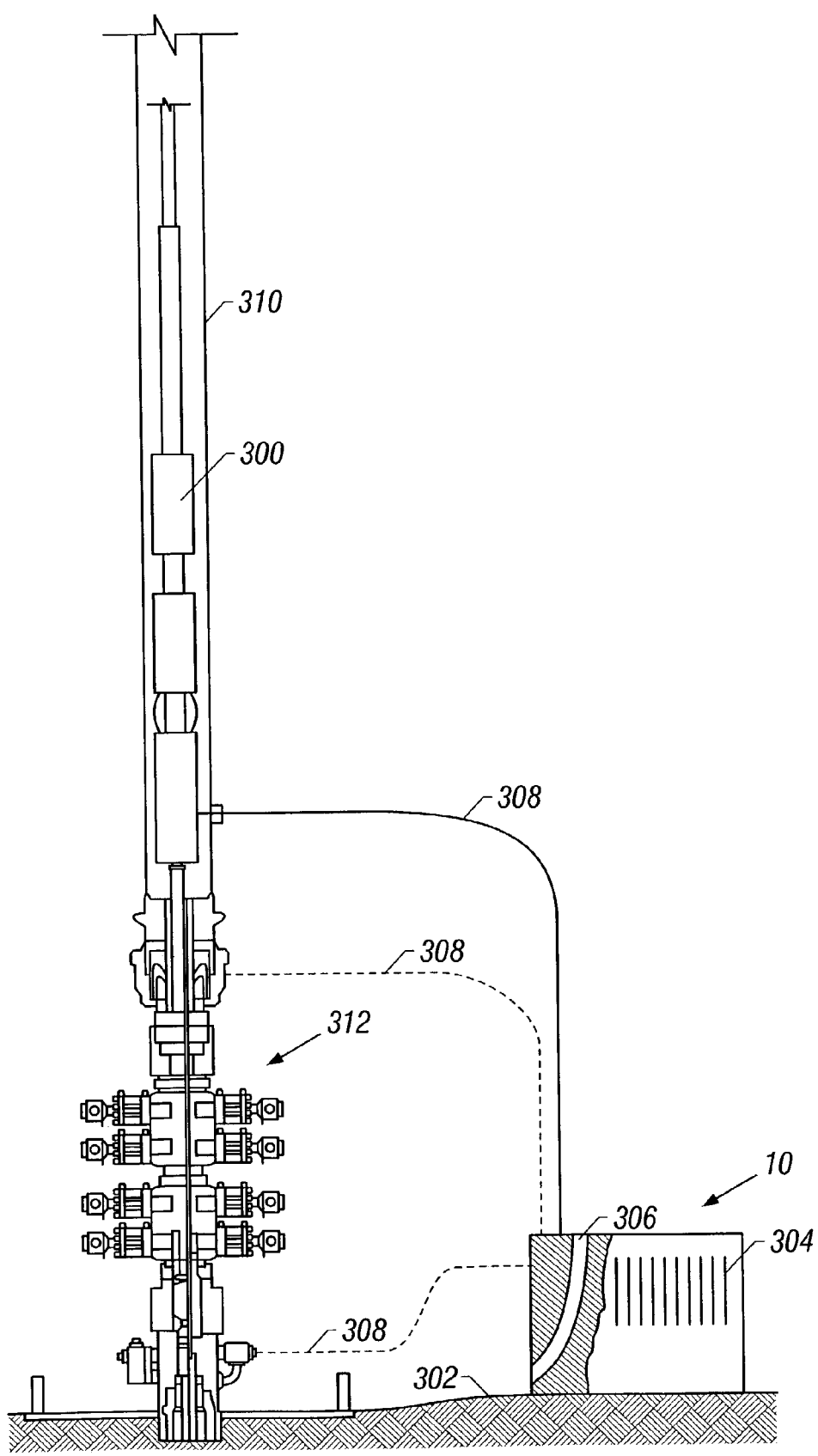
FIG. 6 is a schematic drawing showing an embodiment of the long duration fuel cell system having a fuel cell with a water discharge system positioned proximal a wellhead at the sea floor.

FIG. 6 shows an alternative embodiment of the long duration fuel cell system in which the fuel, cell having a water discharge system is positioned near the sea floor 302 and connected to subsea well equipment 300 to power the equipment. In this embodiment the fuel cell is positioned external to the well. Placing the fuel cell outside of the wellhead allows the fuel cell to utilize the sea water to dissipate the heat generated by the fuel cell. Placing the fuel cell external to the well and utilizing the sea water to dissipate the heat from the fuel cell allows the fuel cell to achieve a greater power output because the heat generation and operating temperatures are better controlled than in a downhole environment.

To facilitate dissipation of the heat from the fuel cell, the fuel cell may incorporate various features, such as fins 304, circulating pumps (not shown), and flow passageways 306 through the fuel cell. In one embodiment, the fuel cell defines generally vertically-extending passageways 306 that are open to the sea at or near the top and the bottom. The cool sea water enters the passageway through the bottom end and rises as the fuel cell heats the sea water. The warmed sea water exiting the top end carries heat from the fuel cell, cooling the fuel cell.

As shown in FIG. 6, the fuel cell 10 is electrically connected to the well equipment within the well or the riser via an electrical conductor 308 extending from the fuel cell, through the riser 310 or wellhead 312, and to the equipment. The equipment powered may be any type of equipment desired as discussed herein. Alternative paths for the routing of the electrical conductor 308 are shown as dashed lines also labeled 308.

Figure 7:
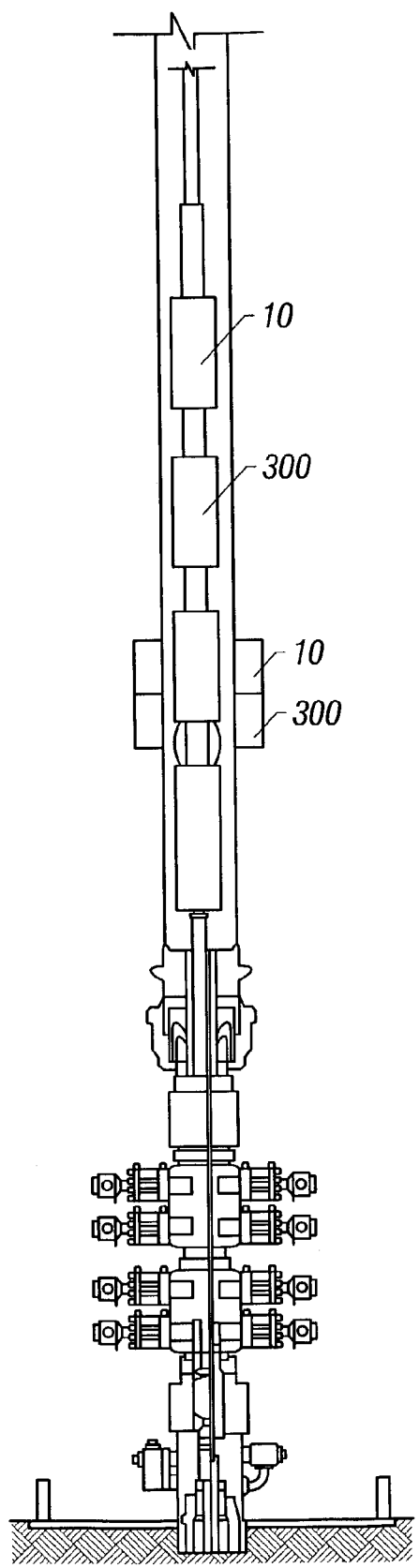
FIG. 7 is a schematic drawing showing an embodiment of the long duration fuel cell system having a fuel cell with a water discharge system positioned in a riser.

FIG. 7 shows another alternative embodiment in which the fuel cell 10 having a water discharge system is placed in the subsea riser 310. This embodiment is similar to that of the downhole fuel cell in that the overall shape of the fuel cell is annular (or shaped to fit in an annulus) and defines a passageway therethrough or thereby that allows tools to pass through the riser, past the fuel cell, and into the well. Accordingly, the cross-sectional shape of the fuel cell could be annular, arcuate, or a portion of an arcuate shape (such as shaped like an arc) so that the fuel cell may fit within an annulus or otherwise reside outside of the well tool passageway (See FIG. 2). Note that cylindrical fuel cells may be useful in certain circumstances in the riser or downhole.

In this embodiment, the fuel cell 10 of the long duration fuel cell system may incorporate cooling passageways (not shown) therethrough to facilitate heat removal. The passageways may be plumbed to openings in the riser to allow seawater to flow into the riser, through the fuel cell cooling passageways, and back out of the riser into the sea. This flow may be accomplished using pumps or the natural tendency of the warmed seawater to rise or other mechanisms.

FIG. 7 also shows a fuel cell 10 having a water discharge system connected to an exterior of a subsea riser 310. In the embodiment shown, the fuel cell 10 powers equipment 300 positioned outside the riser 310. The fuel cell and equipment may be annular or have some other shape that facilitates their attachment to the exterior of the riser 310. The fuel cell mounted to the exterior of the riser may also be used to power equipment within the riser with the appropriate electrical connections and may incorporate the cooling features previously mentioned with other embodiments.

Figure 8:
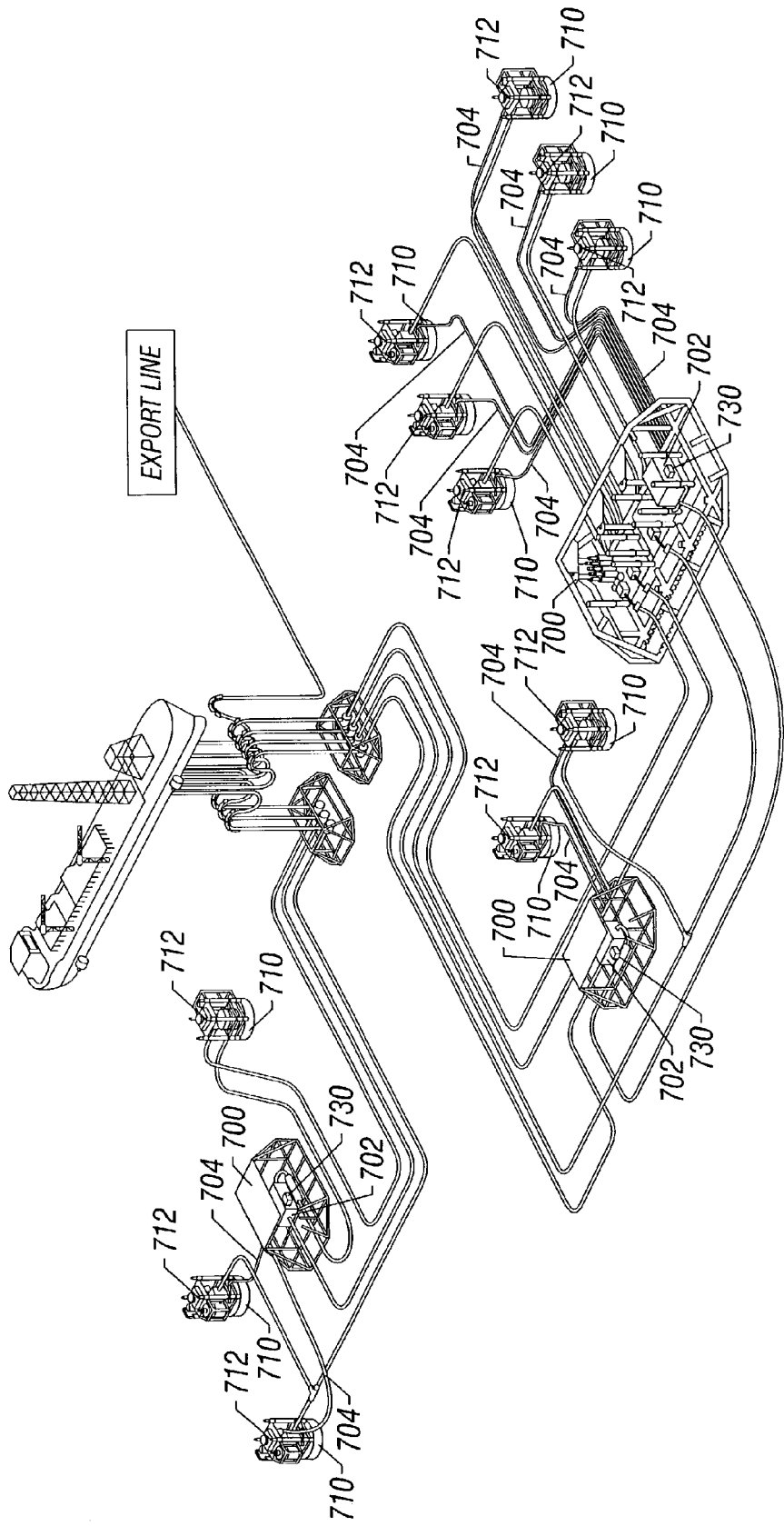
FIG. 8 is an illustration of an embodiment of the long duration fuel cell system used to power a subsea field.

FIG. 8 is illustrative of the long duration fuel cell system used to advantage in a typical subsea field. In a typical subsea field, the production manifolds 700 act as distribution units for oil/gas production, water injection, chemical injection, electrical power, hydraulic power, and communications, for example. The production manifolds 700 control and power the individual subsea wellheads 710, production trees 712, and associated equipment to facilitate production delivery to the surface for processing.

Figure 9:
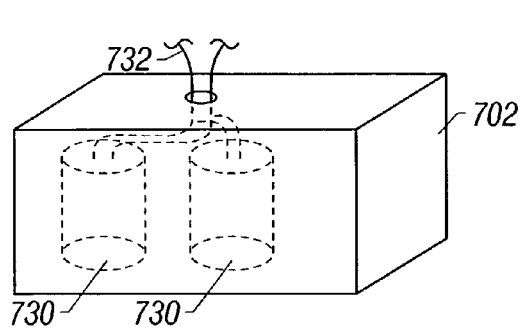
FIG. 9 is an enlarged view of a housing for one or more fuel cells.

In an embodiment of the long duration fuel cell system, the production manifolds 700 are powered by one or more fuel cells 730 having water discharge systems. The power supplied by the one or more fuel cells 730 is then distributed by the production manifolds 700 to the subsea wellheads 710, production trees 712, and seabed equipment including, but not limited to, hydraulic pump motors, booster pumps, communication transmitters, downhole feedthroughs to the well instrumentation and intelligent completions, and downhole tools. The power is distributed from the production manifolds 700 through distribution lines 704. In one embodiment, the one or more fuel cells 730 supplying power to the production manifolds 700 are located within a manifold power supply housing 702. An enlarged view of an embodiment of a manifold power supply housing is shown in FIG. 9. Power is distributed to the production manifold 700 through electrically conductive communication lines 732. The manifold power supply housing 702 can be affixed to the production manifold 700 or located externally.

Depending upon the life of the field, the fuel cells 730 may need to be replaced or replenished periodically. In the embodiment shown in FIG. 9 wherein the one or more fuel cells 730 are located within the manifold power supply housing 702, once the one or more fuel cells 730 have exhausted their resources (oxidant and fuel supply) to generate power, or for periodic maintenance, the fuel cells 730 are replaced. Replacing the fuel cells 730 is accomplished by divers, remote operated vehicles (ROVs), or autonomous underwater vehicles (AUVs), for example.

Figure 10:
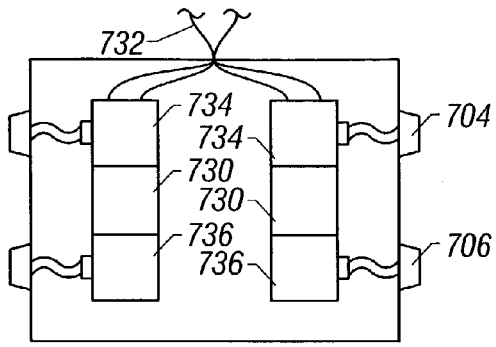
FIG. 10 illustrates a housing through which the fuel cell energy resources are replenished.
Figure 11:
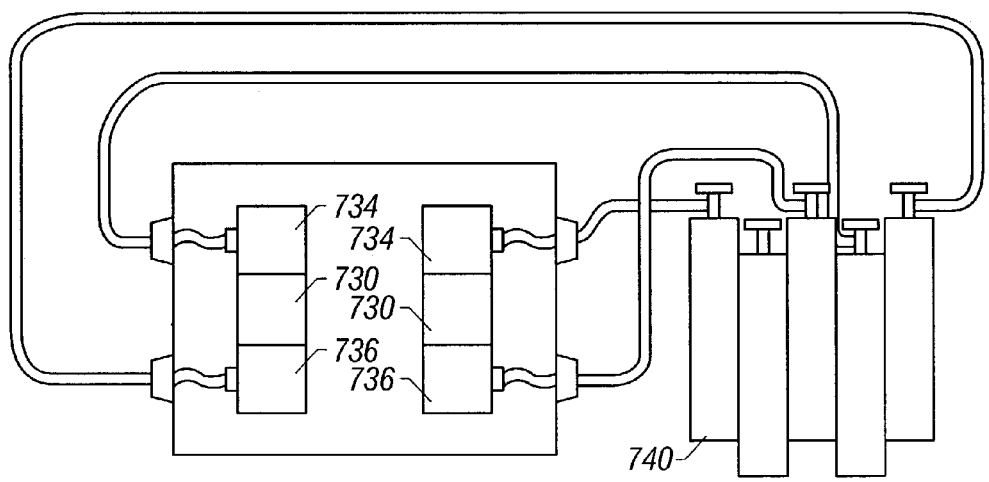
FIG. 11 illustrates a housing through which fuel cell energy resources are provided from a bottle/tank.

In an alternate embodiment shown in FIG. 10, once the one or more fuel cells 730 having water discharge systems have exhausted their resources, or for periodic maintenance, the oxidant reservoirs 734 and the fuel reservoirs 736 are replenished. As shown, the oxidant reservoirs 734 are in communication with a supply valve 704 located on the outside of the power supply housing 702. Similarly, the fuel supply reservoirs 736 are in communication with a supply valve 706. Fuel and oxidant from an external source can be provided to the supply valves 704, 706 and, in turn, to the reservoirs 734, 736 as needed. In one embodiment, shown in FIG. 11, the external source of fuel and oxidant is one or more interchangeable bottles/tanks (containers) 740. The bottles/tanks 740 can either be replaced or replenished when their supply has been exhausted. Again, such replenishing or replacement can be accomplished by divers, ROVS, or AUVs, for example.

Figure 12:
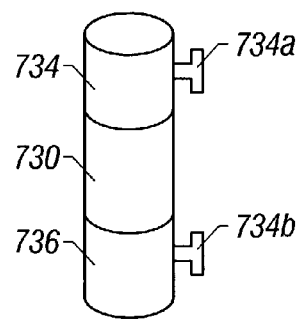
FIG. 12 illustrates fuel cell reservoirs in direct communication with an external supply of energy resources.

In alternative embodiments, the one or more fuel cells 730 providing power to the production manifold 700 are not located within a power supply housing 702. The fuel cells 730 can be affixed to the structure of the production manifold 700 or secured in proximity of the production manifold 700. In such instances, the methods of replacing and replenishing discussed above remain applicable. For example, as shown in FIG. 12, the oxidant reservoir 734 and the fuel reservoir 736 are in direct communication with supply valves 734a, 734b, respectively. Thus, the oxidant and fuel can be replenished from an external source as discussed above.

Figure 13:
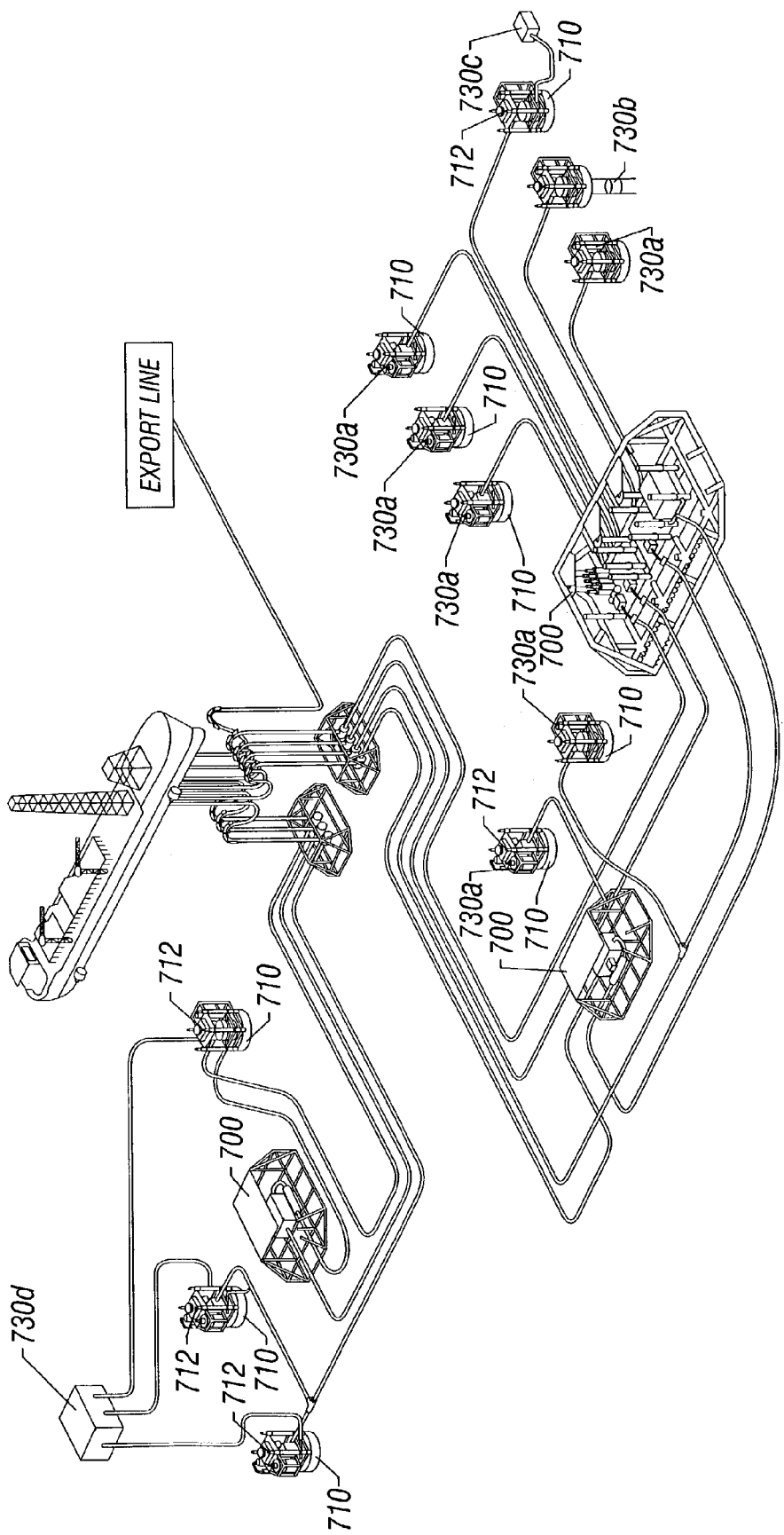
FIG. 13 is an illustration of an embodiment of the long duration fuel cell system having fuel cells with water discharge systems locally situated at the individual wellheads.

In another embodiment of the long duration fuel cell system, shown in FIG. 13, the fuel cells 730 having water discharge systems are locally situated at the individual wellheads 710 and associated equipment. In this embodiment, the need for distribution cabling (indicated by reference 704 in FIG. 8) from the production manifold 700 is removed. As shown, the fuel cells 730 can be located within the wellheads 710 (indicated by 730a) or located externally to supply fuel to one or more wellheads 710 and/or seabed equipment (indicated by 730b and 730c). The fuel cell 730b is located downhole and the fuel cell 730c is external to the subsea wellhead 710 and production tree 712. Further, as indicated by 730d, one or more fuel cells can provide power to several wellheads 710 from an external location. As discussed with reference to the powering the production manifolds 700 above, once the fuel cells 730 have exhausted their resources of oxidant and fuel, the fuel cells 730 can be replaced or the oxidant and fuel supply can be replenished from external sources such as recoverable bottles/tanks. Such replenishing or replacement can be accomplished by divers, ROVs, or AUVs, for example.

Figure 14:
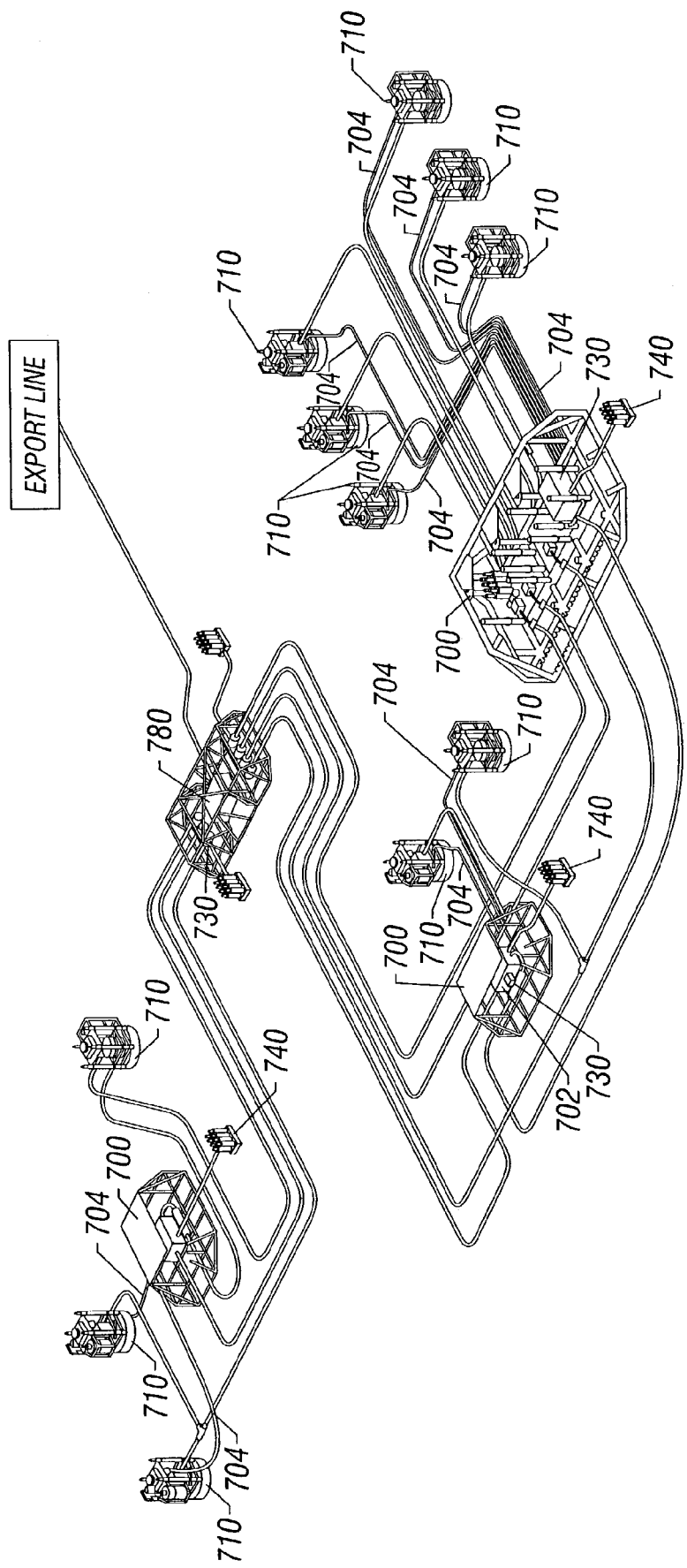
FIG. 14 is an illustration of an embodiment of the long duration fuel cell system powering a subsea field and a subsea processing facility.

FIG. 14 is illustrative of the long duration fuel cell system used to power a subsea field having a subsea processing facility 780. In this embodiment, the fuel cells 730 having water discharge systems are used to power all seabed control systems. As shown, one or more fuel cells 730 provide power for the subsea processing facility 780 to facilitate multiphase boosting, multiphase flow metering, subsea separation and water injection. Similarly, one or more fuel cells 730 provide power for the various production manifolds 700. The power is distributed from the production manifolds 700 to the subsea wellheads 710 and associated equipment through distribution cabling 704.

In the embodiment shown, the fuel cells 730 are supplied oxidant and fuel from recoverable bottles/tanks 740. As discussed above, the bottles/tanks 740 can also be used to replenish exhausted supplies of oxidant and fuel. To facilitate the replenishment, divers, ROVs, or AUVs, can be used to perform the operation.

Figure 15:
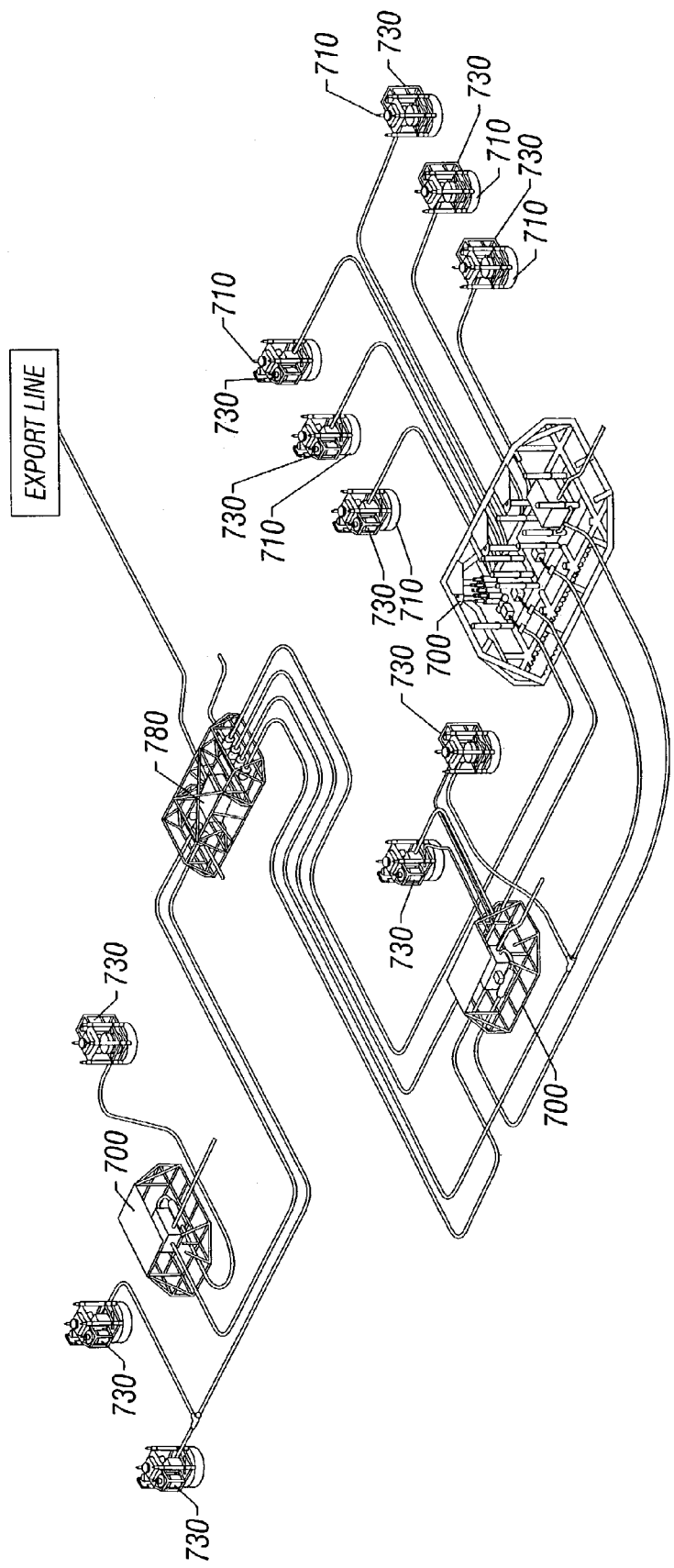
FIG. 15 illustrates an embodiment of the long duration fuel cell system powering a subsea field wherein the fuel cells having water discharge systems provide power directly to the subsea wellheads.

FIG. 15 illustrates a subsea field wherein the fuel cells 730 having water discharge systems provide power directly to the subsea wellheads 710 and associated equipment. In this embodiment, the need for the distribution cabling 704 (shown in FIG. 22) from the production manifolds 700 is removed. Incorporating wireless communications, such as electromagnetic transmission along flowlines or acoustic and blue-green laser, in combination with a subsea processing facility 780 (as described with reference to FIGS. 14 and 15) and the fuel cells 230, the need for umbilicals to the surface is removed. Such embodiments is particularly advantageous when applied to satellite wells located remote from a production facility.

Figure 16:
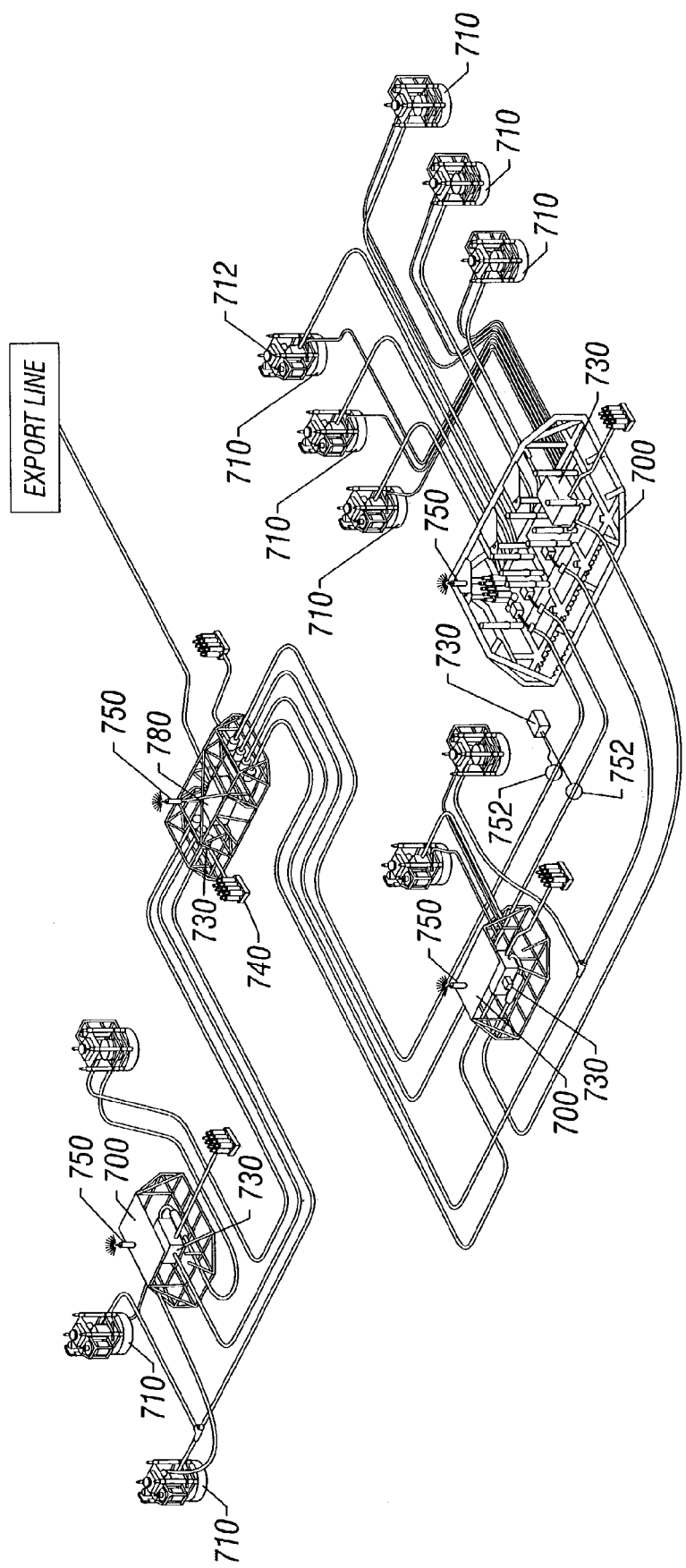
FIG. 16 illustrates an embodiment of the long duration fuel cell system wherein the fuel cells having water discharge systems power a communications hub.

In another embodiment of the long duration fuel cell system, the fuel cells having water discharge systems are used to power a communications hub. As shown in FIG. 16, the fuel cells 730 provide power to communication transmitters/repeaters 750, thus providing a seabed network throughout an entire field. The communication transmitters/repeaters 750 are located at the subsea processor 780 and the production manifolds 700 to provide a communication link. In another embodiment, the communication transmitters/repeaters 750 can be located at individual wellheads 710 or production trees 712, for example.

In yet another embodiment of the long duration fuel cell system, shown schematically in FIG. 16, the fuel cells 730 having water discharge systems are used to power pipeline monitoring devices 752. The pipeline monitoring devices 752 include pipeline stress, corrosion and temperature measurement devices, as well as communication transmitters.

Figure 17:
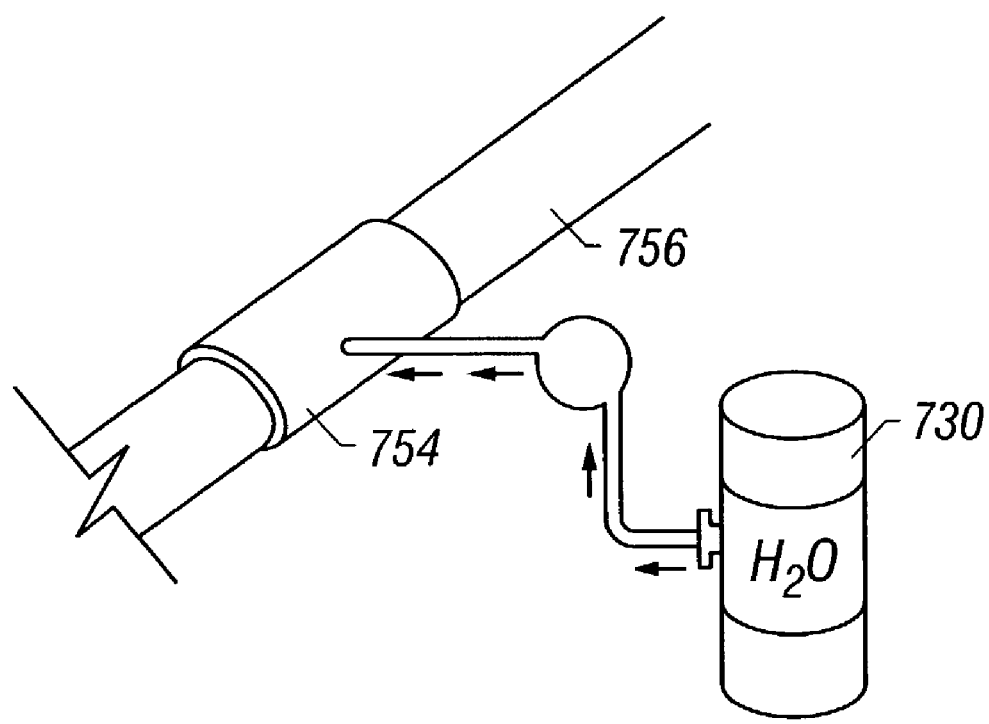
FIG. 17 illustrates the hot water generated by the fuel cells used in a flow loop.
Figure 18:
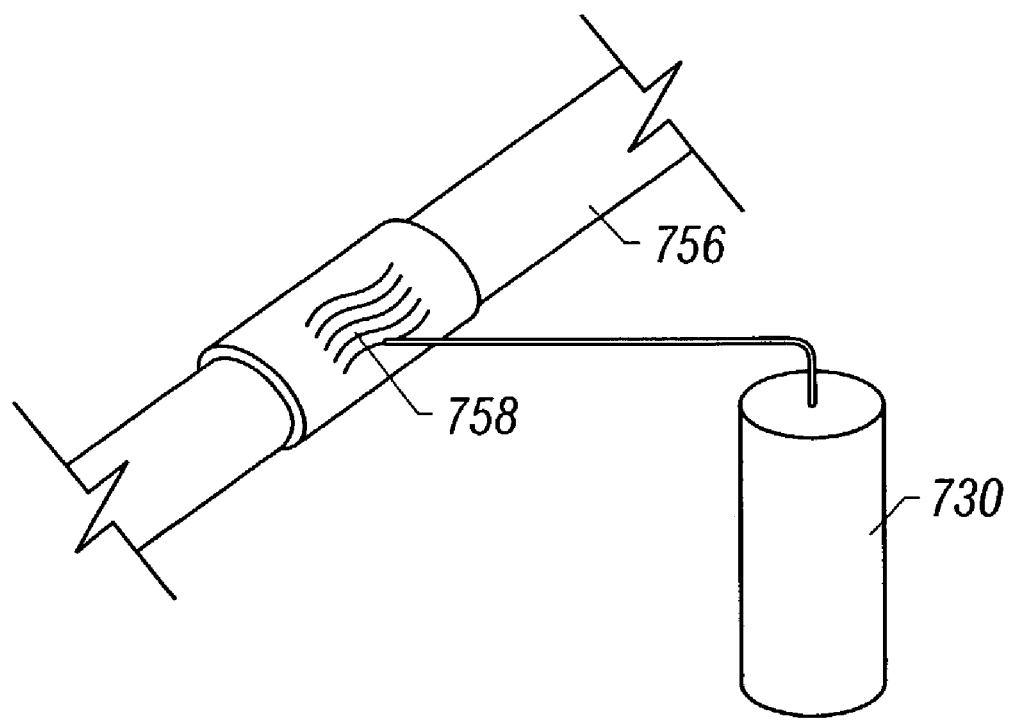
FIG. 18 illustrates the fuel cells powering a heating element.

In still another embodiment, the fuel cells having water discharge systems are used for hot water generation. As shown in FIG. 17, the hot water by-product of the fuel cells 730 is hot water that can be introduced into flow loops 754 affixed around the production piping 756 to counter hydrate or waxing problems. Similarly, as shown in FIG. 18, the fuel cells 730 can be used to power a heating element 758 to heat the pipe 756 to again counter hydrate or waxing problems.

Figure 19:
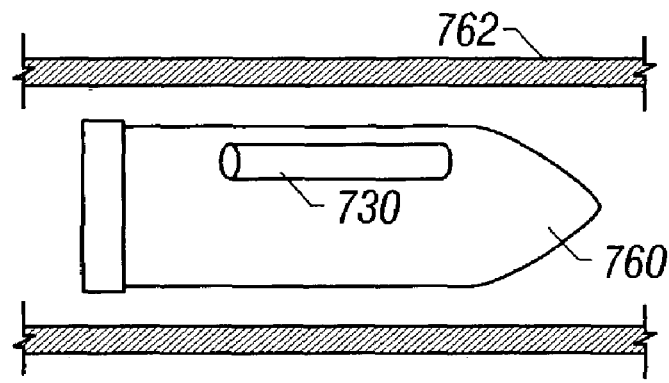
FIG. 19 illustrates the fuel cells used to provide local power for an intelligent pig.

In still another embodiment, shown in FIG. 19, the fuel cells having water discharge systems are used to provide local power for intelligent pigs 760. Rather than rely on external power for movement within a pipeline 762, the fuel cells 730 provide an internal source of power for the pigs 760, that in turn are able to provide traction drive measurement and communication capabilities.

Figure 20:
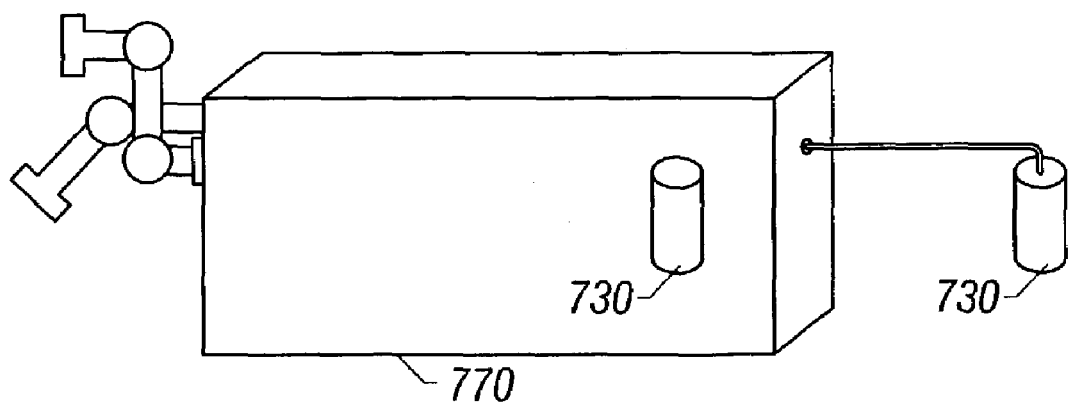
FIG. 20 illustrates the fuel cells used to provide power for mechanical manipulators/robots.

In yet another embodiment, shown schematically in FIG. 20, the fuel cells having water discharge systems are used to provide power for mechanical manipulators/robots 770. As shown in the Figure, the mechanical manipulators/robots 770 can be powered from an internal fuel cell 730 or can be powered by an fuel cell 730. Further, the mechanical manipulators/robots 770 can have a battery rechargeable by the fuel cells 730. The remote manipulators enable autonomous maintenance tasks such as fuel/oxidant storage replenishment, hardware changeout, seabed/pipeline surveys and remote intervention. The manipulators include fixed wellhead manipulators, manifold trolley systems, and mobile seabed units, for example.

The aforementioned examples for which the long duration fuel cell system can be used to advantage is intended to be illustrative and not limiting of the scope of the present invention. The fuel cells of the present invention can be used to provide power to any number of subsea processors, distributors, and equipment. Additional examples of use include hydrate control, chemical injection, flow assurance, battery charging, beacons, separation systems, seismic source acquisition, subsea phase testing, subsea welding, diving systems (habitat), gas compression, and ROV recharge, for example.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A subsea power system, comprising:
   one or more fuel cells having water discharge systems positioned proximal a sea floor, the one or more fuel cells communicating with subsea devices; and
   an impurity removal system adapted to remove impurities from the fuel cell stack.

2. The subsea power system of claim 1, wherein the water discharge systems comprise water discharge pumps.

3. The subsea power system of claim 2, wherein the water discharge pumps are intermittent pumps.

4. The subsea power system of claim 1, wherein the one or more fuel cells are located inside subsea well tubing.

5. The subsea power system of claim 1, wherein the one or more fuel cells are cylindrical.

6. The subsea power system of claim 1, wherein the one or more fuel cells have flow passageways open to the sea adapted for the dissipation of heat.

7. The subsea power system of claim 1, wherein the one or more fuel cells have fins adapted for the dissipation of heat.

8. The subsea power system of claim 1, wherein the one or more fuel cells have circulating pumps adapted for the dissipation of heat.

9. The subsea power system of claim 1, wherein the one or more fuel cells are located internal to the subsea device.

10. The subsea power system of claim 1, wherein the one or more fuel cells are affixed to the subsea device.

11. The subsea power system of claim 1, wherein the subsea device is a subsea wellhead.

12. A subsea power system, comprising:
    one or more fuel cells having water discharge systems positioned proximal a sea floor, the one or more fuel cells communicating with subsea devices;

wherein the one or more fuel cells are located inside a riser pipe of an offshore platform.

13. A subsea power system, comprising:
one or more fuel cells having water discharge systems positioned proximal a sea floor, the one or more fuel cells communicating with subsea devices;
wherein the one or more fuel cells are affixed to the exterior of a subsea riser.

14. The subsea power system of claim 13, wherein the one or more fuel cells defines an open longitudinal bore adapted to allow the passage of subsea downhole tools therethrough.

15. The subsea power system of claim 14, wherein the open longitudinal bore is annular.

16. The subsea power system of claim 14, wherein the open longitudinal bore is arcuate.

17. A subsea power system, comprising:
one or more fuel cells having water discharge systems positioned proximal a sea floor, the one or more fuel cells communicating with subsea devices;
wherein the one or more fuel cells are rectangular.

18. A subsea power system, comprising:
one or more fuel cells having water discharge systems positioned proximal a sea floor, the one or more fuel cells communicating with subsea devices;
wherein the one or more fuel cells defines an open longitudinal bore adapted to allow the passage of cable therethrough.

19. A subsea power system, comprising:
one or more fuel cells having water discharge systems positioned proximal a sea floor, the one or more fuel cells communicating with subsea devices;
wherein the one or more fuel cells are proton exchange membrane fuel cells, phosphoric acid fuel cells, solid oxide fuel cells, or alkaline fuel cells.

20. A subsea power system, comprising:
one or more fuel cells having water discharge systems positioned proximal a sea floor, the one or more fuel cells communicating with subsea devices;
wherein the one or more fuel cells are remotely replenished.

21. The subsea power system of claim 20, wherein the one or more fuel cells are remotely replenished by an ROV.

22. A subsea power system, comprising:
one or more fuel cells having water discharge systems positioned a sae floor, the one or more fuel cells communicating with subsea devices;
wherein the one or more fuel cells are located external to the subsea device.

23. A subsea power system, comprising:
one or more fuel cells having water discharge systems positioned proximal a sea floor, the one or more fuel cells communicating with subsea devices;
wherein the subsea device is a production manifold, communications hub, pipeline monitoring device, heating element affixed to a pipeline adapted to heat the pipeline, intelligent pig, or mechanical manipulator/robot.

24. The subsea power system of claim 23, wherein the subsea device is a production manifold that distributes power to subsea wellheads.

25. A subsea power system, comprising:
one or more fuel cells having water discharge systems positioned proximal a sea floor, the one or more fuel cells communicating with subsea devices;
wherein the fuel cells are adapted to supply hot water to flow loops around a pipeline.

26. A subsea power system, comprising:
one or more fuel cells having water discharge systems positioned proximal a sea floor, the one or more fuel cells communicating with subsea devices;
wherein the subsea devices are selected from wireline tools, measurement while drilling instruments, remote telemetry equipment, downhole sensors, intelligent control devices, and monitoring units.

* * * * *

UNITED STATES PATENT AND TRADEMARK OFFICE
CERTIFICATE OF CORRECTION

| | | |
|---|---|---|
| PATENT NO. | : 7,096,955 B2 | Page 1 of 1 |
| APPLICATION NO. | : 10/326371 | |
| DATED | : August 29, 2006 | |
| INVENTOR(S) | : Wenlin Zhang and Joe Walter | |

It is certified that error appears in the above-identified patent and that said Letters Patent is hereby corrected as shown below:

In column 12, claim 22, line 7, after "positioned" insert -- proximal -- and delete "sae" and insert -- sea --.

Signed and Sealed this

Thirty-first Day of October, 2006

JON W. DUDAS
*Director of the United States Patent and Trademark Office*